United States Patent [19]

Godfrey

[11] 4,044,288

[45] Aug. 23, 1977

[54] TEMPERATURE-RESPONSIVE MOTOR RESTART LIMITER

[75] Inventor: William L. Godfrey, Dallas, Tex.

[73] Assignee: Mobil Oil Corporation, New York, N.Y.

[21] Appl. No.: 681,666

[22] Filed: Apr. 29, 1976

[51] Int. Cl.$^2$ ............................................. H02H 7/08
[52] U.S. Cl. .................................. 318/485; 318/484; 318/473; 318/447; 361/25; 361/29
[58] Field of Search ............... 318/447, 452, 473, 485, 318/487, 471, 473; 317/13 A, 22; 307/117

[56] References Cited

U.S. PATENT DOCUMENTS

| 3,742,303 | 6/1973 | Dageford | 317/22 |
| 3,875,487 | 4/1975 | White | 318/447 |

Primary Examiner—Robert K. Schaefer
Assistant Examiner—Michael K. Mutter
Attorney, Agent, or Firm—C. A. Huggett; George W. Hager, Jr.

[57] ABSTRACT

A motor is electrically coupled to a power source through a motor starter. The motor starter is selectively operated by a relay to connect and disconnect the power source to the motor. A counter is set whenever a select motor temperature condition exceeds a predetermined level to provide an indication of the number of motor starts. The relay is operated to cause the motor starter to disconnect the power source from the motor whenever the motor fails to run continuously during a given time period following a predetermined number of starts.

9 Claims, 4 Drawing Figures

TEMPERATURE-RESPONSIVE MOTOR RESTART LIMITER

BACKGROUND OF THE INVENTION

Induction motors are conventionally used in controlling the operation of a pipeline pumping station. Due to the nature of pipeline operations, these motors are intermittently operated to turn the pumps ON and OFF. The starting current required for operating large induction motors is sufficient to cause a heat build-up in the windings. Too great a heat build-up can damage the windings. It is therefore important that the motor be run long enough to dissipate this start-up heat or, in the alternative, turned OFF long enough to dissipate the heat prior to a subsequent starting of the motor.

Various system malfunctions can cause the pumping operation to be started too frequently for safe operation of these large induction starting motors. Two such examples are resistor failures in the unit starter, resulting in a pulsing of the starter, and pressure fluctuations at pressure controlled stations. Various electromechanical devices have been utilized to prevent these malfunctions from resulting in heat build-up damage to the starting motor. Such devices have included stepping switches and timers for counting the number of motor startings and ensuring a minimum cooling time between each starting.

SUMMARY OF THE INVENTION

The present invention is directed to a method and apparatus for controlling the connection of a power source to a motor to prevent damaging heat build-up in the motor due to the starting currents. In this aspect, a count is made of the motor starts during the time that a select temperature condition of the motor exceeds a predetermined level. The count is reinitiated whenever the motor runs continuously for a first time period following a predetermined number of starts. The motor is inhibited from restarting during a second time period whenever the motor fails to run continuously for the first time period following the predetermined number of starts.

More particularly, a counter is set to count motor starts whenever a select temperature condition of the motor exceeds a predetermined level. A first timer is started in response to the output of the counter reaching a predetermined count of motor starts. This first timer provides a reset signal to the counter at the end of its time period to cause the counter to reinitiate the count of motor starts. Should the motor fail to run continuously for the time period of the first timer, such first timer is disabled, a second timer is started, and a flip-flop is set to inhibit further motor starts during the time period of such second timer. This second timer provides a reset signal to the counter and flip-flop at the end of its time period to cause the counter to reinitiate the count of motor starts.

In a further aspect, the time period of the first time is selected in response to the cooling rate of the motor while running when the select temperature condition of the motor exceeds the predetermined level. The time period of the second timer is selected in response to the cooling rate of the motor while idle when the select temperature condition of the motor exceeds the predetermined level.

DETAILED DESCRIPTION OF THE PREFERRED EMBODIMENT

Figure 1:
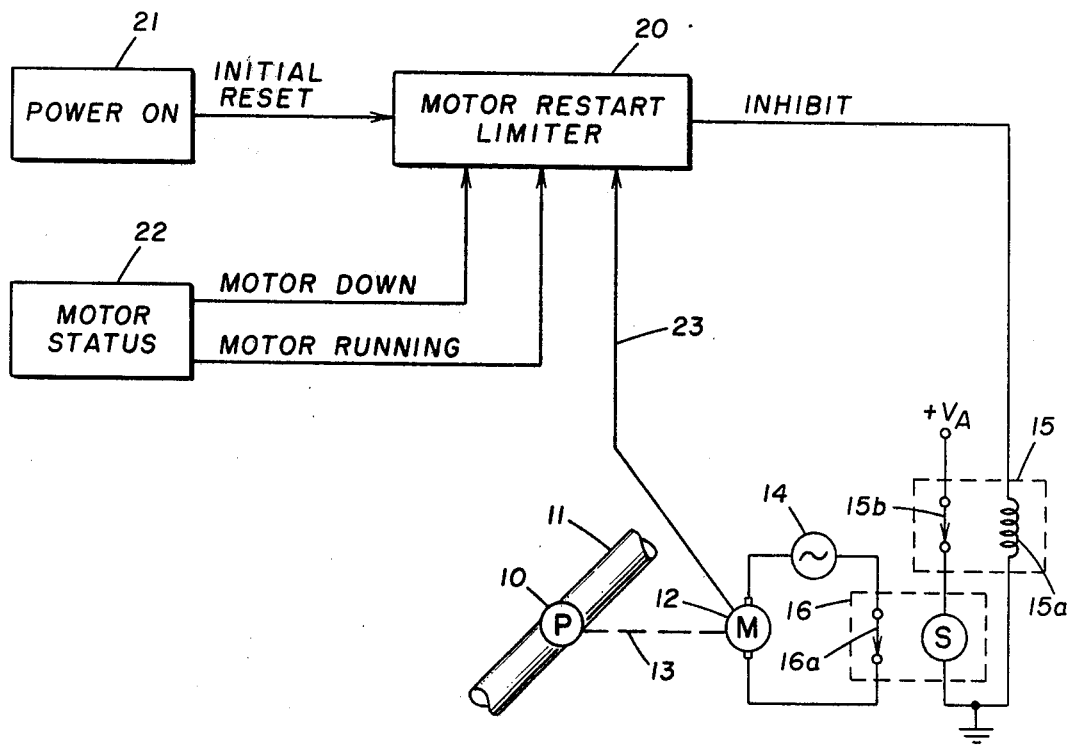
FIG. 1 illustrates a typical motor-driven pumping operation including the motor restart limiter of the present invention.

Referring now to FIG. 1, there is illustrated a pump 10 for delivering fluid products along a pipeline 11. The pump 10 is driven by the motor 12 shown mechanically coupled to the pump by way of dashed line 13. The motor 12 may be a conventional single-phase induction motor. A motor power supply 14 is coupled to the motor 12 by way of contacts 16a of a starter 16 and provides the single-phase AC power required for driving the motor 12. A motor control relay 15 includes normally closed contacts in series with the starter 16 and the voltage source $V_A$. The operation of motor control relay 15 is controlled by a motor inhibit signal from the motor restart limiter 20.

Under normal operating conditions, the motor control relay 15 is de-energized and its normally closed contacts 15b permit the voltage source $V_A$ to energize the starter 16. When starter 16 is energized, the contacts 16a are closed to electrically connect the power source 14 to the motor 12. However, under an adverse operating condition of the motor 12, such as an excessive heat build-up in the windings that could cause damage to the motor, the motor restart limiter 20 produces a motor inhibit signal which energizes the motor control relay 15, opening its normally closed contacts 15b to cause starter 16 to be de-energized, thereby breaking the electrical connection of the power source 14 to the motor 12.

The operation of the motor restart limiter is controlled by an initial reset signal from the power-on unit 21; a motor-down signal and a motor-running signal from the motor-status unit 22; and an indication of a temperature condition of the motor by way of the line 23.

Figure 2:
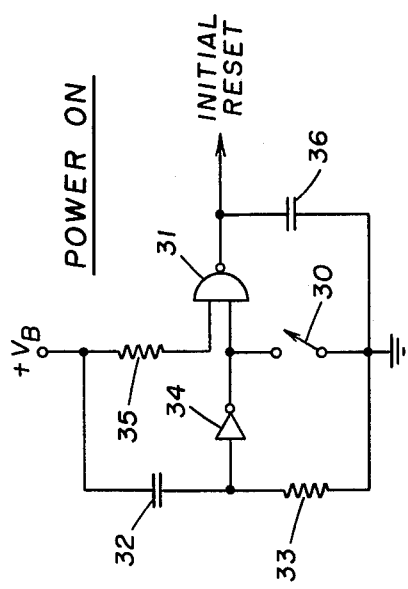
FIGS. 2-4 are electrical schematic diagrams of those portions of FIG. 1 illustrated in block form.
Figure 3:
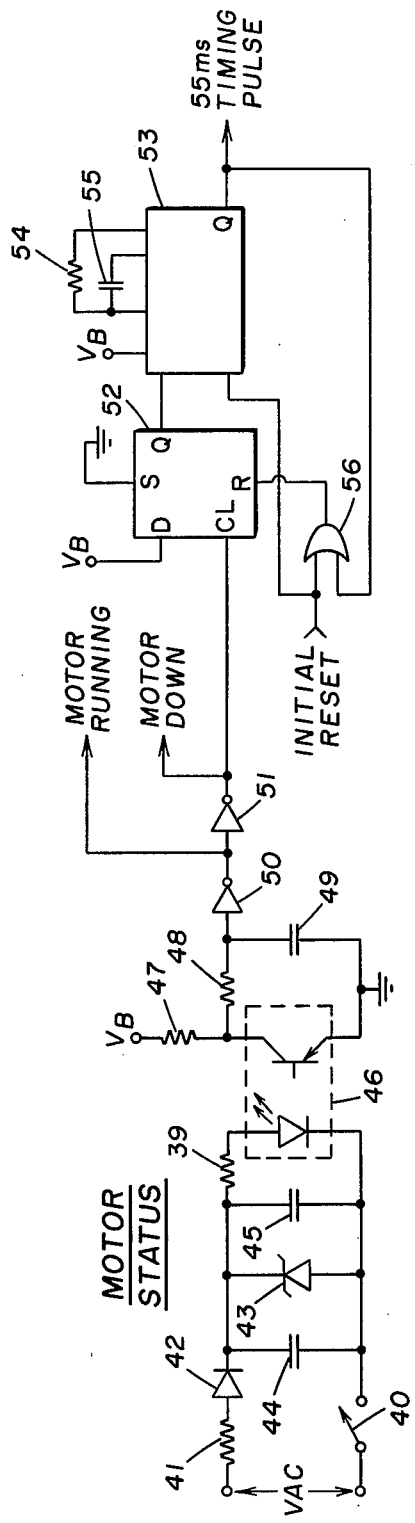
Figure 4:
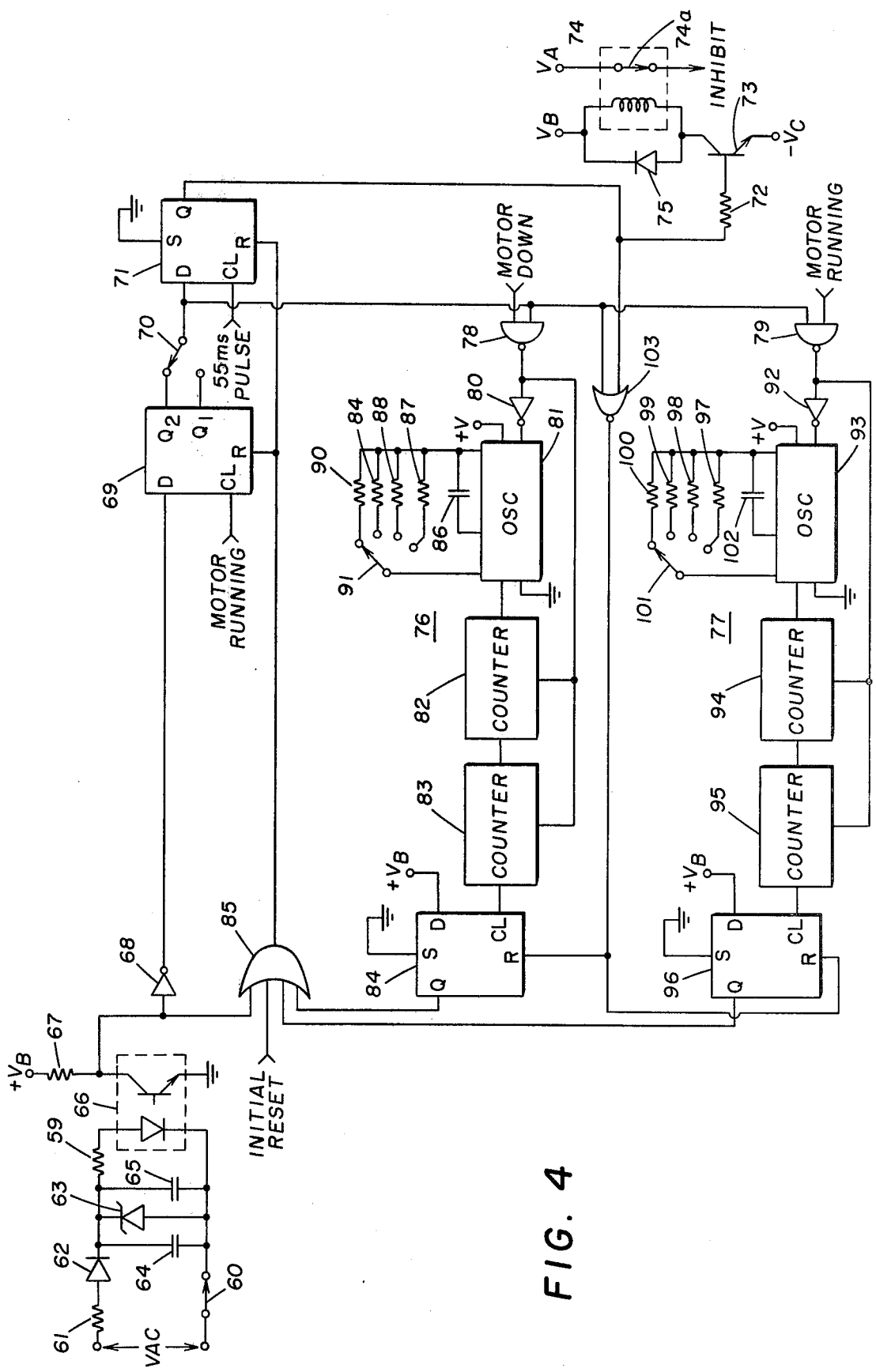

Units 21 and 22 will now be described in detail with reference to FIGS. 2 and 3 prior to the description of the motor restart limiter 20 of FIG. 4. In this manner, the operation of motor restart limiter 20 under the control of units 21 and 22 will be more fully understood.

POWER-ON (FIG. 2)

Prior to the initial attempt at starting up the motor 12, the switch 30 in the power-on unit is closed to provide a ground potential to one input of the NAND gate 31. This sets the output of NAND gate 31 to go to a logic "1". This output is utilized as an initial reset signal to reset the various counters, shift registers, and flip-flops in the motor restart limiter 20. The remaining components 32-36 and the voltage supply $+V_B$ provide the necessary bias conditions for the operation of the power-on unit 21.

MOTOR STATUS (FIG. 3)

The switch 40 is opened and closed in response to the operation of motor 12. When motor 12 is running, switch 40 is closed. When motor 12 is idle, or shut down, switch 40 is open. More specifically, when switch 40 is closed, the voltage VAC is rectified to a 15-VDC level by resistor 41, diode 42, Zener diode 43, and capacitors 44–45. This 15-VDC level forward biases the CED driver portion of the optically coupled isolator 46. This turns ON the transistor portion, pulling its collector to ground through collector resistor 47 to produce a logic "0" signal. This logic "0" signal is applied by way of the RC filter including resistor 48 and capacitor 49 to inverter 50. The output of inverter 50 is therefore a logic "1" signal whenever the motor is running. Inverter 51 is coupled to the output of inverter 50 to provide for an additional logic "1" signal whenever the switch 40 is open to indicate that the motor has shut down or become idle.

When the motor does become idle, inverter 51 provides the logic "1" signal to the clock input of the flip-flop 52. This sets flip-flop 52 to a logic "1" output, which in turn causes the one-shot multivibrator 53 to produce a pulse of 55-millisecond duration for use as a timing pulse by the motor restart limiter 20. The multivibrator 53 is biased by the resistor 54 and capacitor 55. The multivibrator 53 is reset by the initial reset signal, while flip-flop 52 is reset through NOR gate 56 by either the initial reset signal or the 55-millisecond output of the multivibrator 53.

MOTOR RESTART LIMITER (FIG. 4)

The motor restart limiter becomes active when the contacts 60 of a motor temperature sensing device are closed, indicating that the motor has achieved an excessive heat build-up that could cause damage to the motor. Upon closure of the contacts 60, the voltage VAC is rectified to a 15-VDC level by resistors 61, diode 62, Zener diode 63, and capacitors 64–65. This 15-VDC level forward biases the CED driver portion of the optically coupled isolator 66. This turns ON the transistor portion, pulling its collector to ground through collector resistor 67 to produce a logic "0" signal. This logic "0" signal is inverted to a logic "1" by the inverter 68 and applied to the D input of shift register 69. Should the shift register receive a motor-running signal at its clock input while the contacts 60 are closed, the output of shift register 69 shifts a logic "1" level to its $Q_1$ output, indicating that one motor starting attempt has been made since the motor temperature has become excessive. Upon the next start attempt, the resulting motor-running signal will set a logic "1" level on the $Q_2$ output of the shift register 69, indicating that two starting attempts have been made since the motor temperature has become excessive. Shift register 69 therefore functions as a counter of the motor starting attempts.

Switch 70 permits either the $Q_1$ or the $Q_2$ output of shift register 69 to be applied to the D input of the flip-flop 71. Flip-flop 71 is clocked by the 55-millisecond pulse provided by the motor status unit 22 upon the motor being shut down. Accordingly, with the switch 70 set to the $Q_1$ output of shift register 69 and the contacts 60 closed, the flip-flop 71 is set to a logic "1" output upon the first shutdown of the motor. With the switch 70 set to the $Q_2$ output of shift register 69 and the contacts 60 closed, the flip-flop 71 is set to a logic "1" output upon the second shutdown of the motor. Even though only two outputs $Q_1$ and $Q_2$ are utilized for the preferred embodiment described herein, a greater number of outputs could be provided to permit further starting attempts to be counted before the flip-flop 71 is set to a logic "1" by a shutdown of the motor.

The logic "1" setting of flip-flop 71 is applied through resistor 72 to energize the transistor 73, collector current being drawn through the relay 74 to close the relay contacts 74a. Diode 75 provides reverse current protection for the relay 74 when the transistor 73 turns OFF. The closure of relay contacts 74a permits the voltage $V_A$ to energize the relay 15 (FIG. 1) and thereby inhibit further starting attempts of the motor 12.

Upon the setting of flip-flop 71 to enable the inhibiting of the motor 12, a timer 76 is also started in the following manner. The logic "1" output of shift register 69 and the motor-down signal set the output of gate 78 to logic "0". This logic "0" is inverted to logic "1" by way of inverter 80 to energize the oscillator 81. The back-to-back counters 82 and 83 permit a select number of counts of the oscillator output before the counter 83 is set to a logic "1" output, indicating that the timing period of timer 76 is completed. This sets the clock input of flip-flop 84 to provide a logic "1" output from timer 76. The logic "1" output of timer 76 is applied through gate 85 to clear the count in shift register 69 and also reset flip-flop 71. Such timing period of timer 76 is selected to permit a desired cooling of the motor before further starting attempts are made after the motor has been shut down in response to an excessive heat build-up. The embodiment of FIG. 4 provides for four such selectable timing periods by the setting of switch 91 to one of the four resistors 87–90. Preferable timing periods of 15, 30, 60, and 120 minutes are obtained in accordance with those components listed in TABLE I.

It can be further appreciated that a running motor dissipates heat build-up faster than an idle motor. It is therefore a specific feature of the present invention to further control the operation of the motor restart limiter to permit one or more additional starting attempts of the motor before the motor is inhibited should the motor run continuously for a time period sufficient to permit a desired cooling of the motor. This feature of the present invention is carried out by means of another timer 77 which operates as follows.

A logic "1" output of shift register 69 and a motor-running signal set the output of gate 79 to logic "0". This logic "0" is inverted to logic "1" by way of inverter 92 to energize the oscillator 93. The back-to-back counters 94 and 95 permit a select number of counts of the oscillator output before the counter 95 is set to a logic "1" output, indicating that the timing period of timer 77 is completed. This sets the clock input of flip-flop 96 to provide a logic "1" output from timer 77. This logic "1" output of timer 77 is applied through gate 85 to clear the count in shift register 69 and also reset flip-flop 71. With the shift register 69 and flip-flop 71 thus reset, one or more starting attempts, depending upon the setting of switch 70, will be permitted before the motor can now be inhibited. The embodiment of FIG. 4 provides for four such selectable timing periods by the setting of switch 101 to one of the four resistors 97–100. Preferable timing periods of 15, 30, 60, and 120 minutes are obtained in accordance with those components listed in TABLE I.

TABLE I

| Component | Description |
|---|---|
| Shift Register 69 | RCA CD4015AE |
| Flip-flops 52, 71, 84, and 96 | RCA CD4013AE |
| Oscillators 53, 81, and 93 | RCA CD4047AE |
| Counters 82, 83, 94, and 95 | RCA CD4040AE |
| Isolators 46 and 66 | TI T1L112 |
| Zener diodes 43 and 63 | Motorola 1N4744 |
| Diodes 42, 62, and 75 | Motorola 1N4005 |

TABLE I-continued

| Component | Description |
| --- | --- |
| Transistor 73 | Motorola MPS3705 |
| Relay 74 | Potter and Brumfield KHP17D11-12 |
| Gate 85 | RCA CD4072BE |
| Gate 56 | RCA CD4071BE |
| Gate 103 | RCA CD4001AE |
| Gates 31, 78, and 79 | RCA CD4011AE |
| Inverters 34, 50, 51, 80, and 92 | RCA CD4009AE |
| Resistors 87 and 97 | 11 Kohms |
| Resistors 88 and 98 | 22 Kohms |
| Resistors 89 and 99 | 43 Kohms |
| Resistors 90 and 100 | 91 Kohms |
| Resistors 41 and 61 | 3 Kohms |
| Resistors 35, 47, 67, and 72 | 10 Kohms |
| Resistors 39 and 59 | 1 Kohm |
| Resistor 33 | 1 Mohm |
| Resistor 48 | 100 Kohms |
| Resistor 54 | 47 Kohms |
| Capacitors 44 and 45 | 15 microfarads |
| Capacitors 36, 64, and 65 | 0.01 microfarad |
| Capacitors 86 and 102 | 2200 picofarads |
| Capacitor 55 | 0.47 microfarad |
| Capacitor 32 | 0.047 microfarad |
| Capacitor 49 | 0.1 microfarad |

I claim:

1. A system for controlling the operation of a motor to prevent damaging heat build-up within the motor, comprising:
    a. means responsive to the condition of said motor for producing a start signal each time the motor is started and a stop signal each time the motor fails,
    b. means responsive to a select temperature condition of said motor for indicating whenever such temperature condition exceeds a predetermined level,
    c. a counter that is set to count start signals whenever the temperature condition exceeds said predetermined level,
    d. means for resetting said counter whenever the motor runs continuously during a first time period following a predetermined number of motor starts,
    e. means for inhibiting the restarting of the motor during a second time period whenever the motor fails to run continuously for said first time period following said predetermined count of motor start signals, and
    f. means for allowing the restarting of said motor following said second time period.

2. The system of claim 1 wherein said first time period is greater than said second time period.

3. The system of claim 2 wherein said first time period is at least three times greater than said second time period.

4. The system of claim 1 wherein the ratio of said first time period to said second time period is in accordance with the ratio of the cooling rate of the motor while running to the cooling rate of the motor while idle when said temperature condition is in excess of said predetermined level.

5. The system of claim 1 wherein said means for resetting said counter whenever the motor runs continuously during a first time period is a timer that is started in response to said counter reaching said predetermined number of motor starts to provide a reset signal to the counter at the end of said first time period.

6. The system of claim 1 wherein said means for inhibiting the restarting of the motor during a second time period includes:
    a. a flip-flop that is set to permit the inhibiting of the motor in response to the first motor failure following the counter reaching said predetermined number of counts, and said means for allowing the restarting of said motor following a second time period includes:
    b. a timer that is started in response to the first motor failure following the counter reaching said predetermined number of motor starts to provide a reset signal to said counter and said flip-flop at the end of said second time period.

7. A method of controlling the operation of a motor, comprising the steps of:
    a. initiating a count of the number of motor starts during the time that a select temperature condition of the motor exceeds a predetermined level,
    b. reinitiating said count whenever the motor runs continuously for a first time period following a predetermined count of motor start signals,
    c. inhibiting the restarting of the motor during a second time period whenever the motor fails to run continuously for said first time period following said predetermined number of motor starts, and
    d. restarting the motor following said second time period.

8. The method of claim 7 wherein said first time period is selected in response to the cooling rate of the motor while running when said select temperature condition exceeds said predetermined level.

9. The method of claim 7 wherein said second time period is selected in response to the cooling rate of the motor while idle when said select temperature condition exceeds said predetermined level.

* * * * *